(12) United States Patent
Shortland

(10) Patent No.: US 6,887,571 B2
(45) Date of Patent: May 3, 2005

(54) COLORED SILICON CARBIDE

(75) Inventor: Adrian John Shortland, Birmingham (GB)

(73) Assignee: Altro, Limited, Nertfordshire (GB)

( * ) Notice: Subject to any disclaimer, the term of this patent is extended or adjusted under 35 U.S.C. 154(b) by 0 days.

(21) Appl. No.: 10/240,534

(22) PCT Filed: Mar. 30, 2001

(86) PCT No.: PCT/GB01/01447

§ 371 (c)(1),
(2), (4) Date: Apr. 21, 2003

(87) PCT Pub. No.: WO01/74951

PCT Pub. Date: Oct. 11, 2001

(65) Prior Publication Data

US 2003/0157329 A1 Aug. 21, 2003

(30) Foreign Application Priority Data

Mar. 31, 2000 (GB) .............................. 0007731

(51) Int. Cl.$^7$ ................................ B32B 5/16
(52) U.S. Cl. ...................... 428/403; 428/404; 428/405; 428/406; 428/407
(58) Field of Search ................ 428/403, 404, 428/405, 406, 407

(56) References Cited

U.S. PATENT DOCUMENTS

| | | |
|---|---|---|
| 1,910,444 A | 5/1933 | Nicholson |
| 4,505,720 A | 3/1985 | Gabor et al. .................. 51/295 |
| 5,009,675 A | 4/1991 | Kunz et al. .................... 51/295 |
| 5,039,632 A | 8/1991 | Riedel et al. .................. 501/92 |
| 5,631,045 A * | 5/1997 | Yaniv .......................... 427/221 |
| 6,037,019 A * | 3/2000 | Kooyer et al. ............... 427/598 |
| 6,623,793 B2 * | 9/2003 | Mushett et al. ........... 427/163.4 |
| 6,660,374 B2 * | 12/2003 | Smetana et al. ............. 428/327 |

FOREIGN PATENT DOCUMENTS

| | | |
|---|---|---|
| DE | 19751448 | 5/1999 |
| EP | 0345795 | 12/1989 |
| EP | 0434300 | 6/1991 |
| GB | 590110 | 7/1947 |
| GB | 655182 | 7/1951 |
| GB | 964984 | 7/1964 |
| GB | 2004906 | 9/1977 |
| GB | 2246120 | 1/1992 |

OTHER PUBLICATIONS

Derwent Abstract 1993–152930 & CA 1285433 A NRC.
Derwent Abstract 1966–021134 & DE 4418945 A Hoechst.
Derwent Abstract 1993–252567 & PTO50170539 A Topshiba.
Derwent Abstract 1982–47313E & JP570071868 A. Hitachi.

\* cited by examiner

Primary Examiner—Leszek B Kiliman
(74) Attorney, Agent, or Firm—Baker Botts LLP

(57) ABSTRACT

Silicon carbide particles coated with a pigmented coating result in silicon carbide particles which can be used in slip resistant flooring to achieve the desired slip resistance whilst giving improved aesthetic properties. The pigmented coating can be an organic coating such as a two part epoxy system or a water based or solvent based epoxy. Alternatively the pigmented coating can be an inorganic coating such as a ceramic glaze. Also provided are methods of coating silicon carbide particles with either an organic or an inorganic pigmented coating. Further provided are safety flooring materials including silicon carbide particles having a pigmented coating.

13 Claims, No Drawings

COLORED SILICON CARBIDE

The present invention relates to the production of coated silicon carbide particles, in particular to pigment coated silicon carbide particles.

Silicon carbide, also known as carborundum is a synthetic solid material comprising silicon and carbon. The hardness of silicon carbide is similar to that of diamond. Silicon carbide is produced electrolytically from graphite and silica under the influence of extreme heat and the product is then crushed to give a wide range of particle sizes.

Silicon carbide is a particulate material which has a smooth surface making it reflective and angular edges making it useful in products requiring slip resistant properties. Silicon carbide is only available in two colours which are black and dark green.

Silicon carbide is used in a variety of industries from grinding wheel manufacture to flooring.

Silicon carbide, is used to confer slip resistance and wear resistance to a variety of floors including vinyl safety floors. Its efficacy in achieving slip resistance has meant that its use is very wide spread in slip resistant flooring manufacture.

In flooring it is preferred to use the black version of the silicon carbide although it is less pure.

Being black, and used on the surface of a safety flooring, silicon carbide tends to darken the overall tone of the finished flooring. This is particularly an issue when high levels are used. In order to avoid the tone being darkened excessively, attempts have been made to use larger particles of silicon carbide, the idea being that, with larger particles, for a given mass per unit area, fewer particles can be used to achieve a particular slip resistance. However, with large black particles on a light background, the product appears very "functional" and is considered less aesthetically acceptable. Also if lost from the surface, large particles leave large surface voids.

Some users dislike the high reflectivity of the silicon carbide which is considered undesirable for certain applications.

It would therefore be advantageous to provide silicon carbide particles in colours other than black or dark green for use in slip resistant flooring to achieve the desired slip resistance while obtaining improved aesthetic properties.

Accordingly from a first aspect the present invention provides silicon carbide particles coated with a pigmented coating.

The coating may be a pigmented organic coating. Alternatively the coating may be a pigmented inorganic coating.

Where the pigment is a pigmented organic coating it is preferably a two part epoxy system where the two parts are mixed together to provide the pigmented organic coating.

Alternatively the pigmented organic coating may be a water based or solvent based epoxy or two part solvent based polyurethane or waterborne polyurethane or acrylic.

Where the coating is an inorganic coating it is preferably a ceramic glaze.

The silicon carbide particles may be coated with a coupling agent beneath the pigmented coating to aid adhesion of the pigmented coating.

The coating of the silicon carbide particles with a pigmented resin allows a range of colours to be obtained whilst still maintaining the angular edges of the particles which provide the required slip resistance when used in safety flooring.

The pigment can be any colour and the colour can be solid or metallic.

The silicon carbide particle size range is preferably from 0.2 to 0.8 mm.

According to a second aspect the present invention provides a method of applying an organic pigmented coating to silicon carbide particles comprising the steps of:— mixing silicon carbide particle with a liquid pigmented organic coating system; curing the coated particles.

The coated particles are preferably sieved to remove any agglomerates. The organic system is preferably a two part system wherein the two parts are mixed together then mixing with the silicon carbide particles. The organic coating system is preferably applied at a rate of 90–140 g/m$^2$ of silicon carbide surface area, most preferably 120 g/m$^2$ silicon carbide surface area.

The method preferably further comprises coating the silicon carbide particle with a coupling agent before applying the organic coating system.

The coupling agent is used to maximise adhesion of the organic coating system to the silicon carbide particles.

More than one coating of the organic coating system can be applied

In a third aspect the present invention provides a method of applying an inorganic pigmented coating to silicon carbide particles comprising the steps of fusing an inorganic pigmented coating onto the silicon carbide particles.

The inorganic coating is preferably a ceramic glaze.

Preferably the ceramic glaze comprises:

1) silicon dioxide which promotes low expansion, high durability and abrasion resistance;
2) aluminium trioxide which suppresses phase separation and crystallization and improves acid resistance;
3) zirconia as an opacifier and to improve alkali resistance;
4) a selection of complex metal oxides as inorganic pigments; and
5) a flux to reduce the temperature at which the components of the glaze fuse together to form a homogenous mass. The flux preferably includes combinations from alkali metal oxides, alkaline earth metal oxides, zinc oxide, boric oxide and lead oxide.

The alkali metal oxides may include lithium oxide, sodium oxide or potassium oxide.

The alkaline earth metal oxides may include magnesium oxide, calcium oxide and barium oxide.

The glaze may be made by mixing and fusing the selected components in a high temperature furnace to form a glass. The glass is preferably milled to form a powder known as a frit.

To coat the silicon dioxide particles with the ceramic glaze the frit is preferably applied to the particles, the water is removed by drying at almost 100° C. and the coated particles are then fired at temperatures of from 800° C. to 1400° C., most preferably 1200° C. to remelt the powder and form a glaze.

The present invention further provides a safety flooring material including the coloured silicon carbide particles of the present invention.

The silicon carbide particles confer slip resistance of the safety flooring material owing to their angular edges.

The coloured silicon carbide particles may be the same colour as the flooring material or alternatively the coloured silicon carbide particles may be a contrasting colour. The use of coloured silicon carbide particles means that the desired aesthetic effects can be achieved.

The safety flooring material could be made from plasticised PVC, plasticised acrylic, rubber, epoxy or polyurethane flow applied resin systems.

The present invention will now be described in more detail with reference to the following examples.

General Particle Coating

1. Organic Coating

The silicon carbide particles are mixed under low shear in a liquid pigmented organic coating, usually after coating with a coupling agent to improve adhesion of the final coating. The organic coating can be a two component epoxy or alternatively it could be a water based or solvent based epoxy or two part solvent based polyurethane or waterborne polyurethane or acrylic.

The application of frictional heat and/or externally applied heat reduces the viscosity of the coating system, allowing good coverage before the onset of curing which is accompanied by a rise in the viscosity. With water based systems the water would first be removed at 100° C.

Full curing is achieved after the coating has fully hardened onto the silicon carbide and there is no evidence of residual coating liquid.

The resulting product is then sieved to give correct particle size distribution.

Particle agglomeration is avoided by optimising the ratio of coating material to silicon carbide and agitation by tumbling or stirring in a rotary action mixer.

2. Inorganic Coating

Inorganic pigmented coatings such as vitreous enamel can be fused onto the silicon carbide particle at high temperatures.

Specific Formulations and Method

1. Pre-treatment—The silicon carbide particles are coated with the following coupling agent to maximise adhesion of the final coating. The coupling agent solution is added to the silicon carbide at 0.3 parts per hundred of silicon carbide and blended in a low shear rotary action mixer before force drying if necessary.

| Coupling agent formulation | |
| --- | --- |
| | Parts by weight |
| A1100 (gamma aminopropyl silane) | 50 |
| isopropyl alcohol (IPA) | 50 |

2. Coating—A resin system is added to the dried, pre-treated silicon carbide whilst mixing. Mixing is continued until the coating is cured. The product is forced dry and post cured if necessary.

The resin is added at a rate of 120 g per $m^2$ of silicon carbide surface area.

| Resin System Formulations | |
| --- | --- |
| | Parts by weight |
| a) Solvent based epoxy | |
| Part A) | |
| Eurepox 7001/75 (75% epoxy in xylene) | 420 |
| Methyl isobutyl ketone | 150 |
| Xylene | 40 |
| n-butanol | 60 |
| pigment/filler | 330 |
| Part B) | |
| Euredur 30/55 (isolated polyamine adduct solution) | 245 |
| Xylene | 20 |
| Butanol | 5 |
| b) Water based epoxy | |
| Part A) | |
| Eurepox 776 (modified epoxy resin) | 45 |
| Pigment | 16.5 |
| Barytes (barium sulphate) | 38.5 |
| Part B) | |
| Euredur XE36 (polyamine adduct in water) | 40 |
| Water | 10 |

| Resin System Formulations | |
| --- | --- |
| | Parts by weight |
| c) Solvent free epoxy | |
| Part A) | |
| Eurepox 776 | 42 |
| Pigment | 16 |
| Barytes | 41.6 |
| Antifoam | 0.4 |
| Part B) | |
| Euredur 43 (a cycloaliphatic amine) | 25 |

In each two part resin system the whole of part A is mixed with the whole of part B before application to the silicon carbide particles. Typically the particles are mixed with the two part resin system in a ribbon or other rotary low shear mixer for about 60 minutes after which time the coating on the silicon carbide particles should be hard enough to handle.

What is claimed is:

1. Silicon carbide particles coated with a pigmented coating.

2. Particles according to claim 1 wherein the coating is a pigmented organic coating.

3. Particles according to claim 2 wherein the coating is a two part epoxy system where the two parts are mixed together.

4. Particles according to claim 2 wherein the pigmented organic coating is a water based or solvent based epoxy.

5. Particles according to claim 2 wherein the pigmented organic coating is a two part solvent based polyurethane or waterborne polyurethane or acrylic.

6. Particles according to claim 1 wherein the coating is a pigmented inorganic coating.

7. Particles according to claim 6 wherein the coating is a ceramic glaze.

8. Particles according to claim 7 wherein the ceramic glaze comprises:

silicon dioxide which promotes low expansion, high durability and abrasion resistance;

aluminium trioxide which suppresses phase separation and crystallization and improves acid resistance;

zirconia as an opacifier and to improve alkali resistance;

a selection of complex metal oxides as inorganic pigments; and a flux to reduce the temperature at which the components of the glaze fuse together to form a homogenous mass.

9. Particles according to claim 8 wherein the flux includes combinations from alkali metal oxides, alkaline earth metal oxides, zinc oxide, boric oxide and lead oxide.

10. Particles according to claim 9 wherein the alkali metal oxides include lithium oxide, sodium oxide or potassium oxide.

11. Particles according to claim 9 wherein the alkaline earth metal oxides include magnesium oxide, calcium oxide and barium oxide.

12. Particles according to arty of claims 1–11, wherein particles are coated with a coupling agent beneath the pigmented coating to aid adhesion of the pigmented coating.

13. Particles according to any of claims 1–11 wherein the particles have a size range or from 0.2 to 0.8 mm.

* * * * *

UNITED STATES PATENT AND TRADEMARK OFFICE
CERTIFICATE OF CORRECTION

PATENT NO. : 6,887,571 B2 Page 1 of 1
DATED : May 3, 2005
INVENTOR(S) : Adrian John Shortland It is certified that error appears in the above-identified patent and that said Letters Patent is hereby corrected as shown below:

<u>Title page,</u>
Item [73], Assignee, "Altro, Limited, Nertfordshire (GB)" should read
-- Altro, Limited, Hertfordshire (GB) --.

Signed and Sealed this

Thirteenth Day of September, 2005

JON W. DUDAS
*Director of the United States Patent and Trademark Office*